(12) United States Patent
Baek et al.

(10) Patent No.: US 9,516,234 B2
(45) Date of Patent: Dec. 6, 2016

(54) APPARATUS AND METHOD FOR TRANSMITTING A FRAME IMAGE OF A CAMERA

(71) Applicant: Samsung Electronics Co., Ltd., Gyeonggi-do (KR)

(72) Inventors: Woohyun Baek, Gyeonggi-do (KR); Sungwook An, Seoul (KR); Sungkoo Lee, Gyeonggi-do (KR); Hyunho Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 226 days.

(21) Appl. No.: 13/766,183

(22) Filed: Feb. 13, 2013

(65) Prior Publication Data

US 2013/0215295 A1    Aug. 22, 2013

(30) Foreign Application Priority Data

Feb. 16, 2012  (KR) .................. 10-2012-0016038

(51) Int. Cl.
  *H04N 5/232*    (2006.01)
  *H04N 1/21*     (2006.01)

(52) U.S. Cl.
  CPC ........ *H04N 5/23293* (2013.01); *H04N 1/2112* (2013.01); *H04N 5/23296* (2013.01)

(58) Field of Classification Search
  CPC ........... H04N 1/2112; H04N 2101/00; H04N 1/00453; H04N 5/772; H04N 5/23293
  USPC .................................................. 348/240.99
  See application file for complete search history.

(56) References Cited

U.S. PATENT DOCUMENTS

| | | | | |
|---|---|---|---|---|
| 7,787,048 B1* | 8/2010 | Vojkovich | .............. | H04N 7/012 348/448 |
| 2004/0126089 A1* | 7/2004 | Suzuki | ................ | G11B 27/105 386/243 |
| 2005/0018910 A1* | 1/2005 | Jeffrey | .................. | H04N 19/60 382/232 |
| 2011/0109766 A1* | 5/2011 | Roh et al. | .................. | 348/223.1 |
| 2011/0261228 A1* | 10/2011 | Peng et al. | ................. | 348/231.6 |
| 2012/0062767 A1* | 3/2012 | Satomi et al. | ........... | 348/231.99 |
| 2013/0208165 A1 | 8/2013 | An et al. | | |

FOREIGN PATENT DOCUMENTS

| | | |
|---|---|---|
| CN | 1917618 A | 2/2007 |
| CN | 1963741 A | 5/2007 |
| CN | 103259975 A | 8/2013 |
| TW | 201138431 A1 | 11/2011 |

OTHER PUBLICATIONS

Chinese Search Report, dated May 27, 2016.

* cited by examiner

*Primary Examiner* — Twyler Haskins
*Assistant Examiner* — Fayez Bhuiyan
(74) *Attorney, Agent, or Firm* — Cha & Reiter, LLC

(57) ABSTRACT

A method of processing an image of a portable terminal, the portable terminal comprising an image signal processor (ISP) and an application processor (AP) includes: acquiring, at the ISP, an image from a camera unit of the portable terminal for each frame of a plurality of frames during an operation of the camera; generating, at the ISP, a display image and a compression image by processing the acquired image; transmitting the display image generated by the ISP for each frame and the compression image at a preset frame interval; and displaying, at the AP, the acquired display image and buffering, at the AP, the compression image.

19 Claims, 14 Drawing Sheets

APPARATUS AND METHOD FOR TRANSMITTING A FRAME IMAGE OF A CAMERA

CLAIM OF PRIORITY

This application claims, pursuant to 35 U.S.C. §119(a), priority to and the benefit of the earlier filing date of a Korean patent application filed on Feb. 16, 2012 in the Korean Intellectual Property Office and assigned Serial No. 10-2012-0016038, the entire disclosure of which is hereby incorporated by reference.

BACKGROUND OF THE INVENTION

1. Field of the Invention

The present invention relates to an apparatus and a method for processing data, and more particularly to an apparatus capable of variably transmitting frame images of a camera device according to a system bandwidth and a method thereof.

2. Description of the Related Art

A camera device or a portable terminal having a camera function can provide a high quality image as well as various convenient functions. In the prior art, an image sensor (also referred to as a 'camera sensor') of the camera device is employed to sense images having a full High Definition (HD) resolution which allows the camera device to display images sensed from the camera sensor during a preview mode as a preview image.

In operation, if a user presses a shutter button, the camera device stores an image acquired by the camera sensor. When the user presses the shutter button, there is a shutter delay or a shutter lag between the time of sensing an image to be the full size image, as opposed to a preview image, and the time of capturing the full-size image. That is, there is a time difference from a shutter activation to a time of photographing a subject by the camera sensor. The time difference may occur due to a photographing environment of the subject and a processing time of an image signal processor. Accordingly, there is a problem in that the user cannot acquire images at a desired point in time due to shutter delay (shutter lag).

A camera device or a terminal equipped with a camera may include an image signal processor for processing images and an application processor for processing various applications of a device including a camera application. The image signal processor is serially connected to the application processor, so that the image signal processor can convert an image acquired by the camera into serial data, and then transmits the serial data to the application processor. Here, the image acquired by the camera may include an image having HD resolution or greater (Ultra High Definition resolution (UHD)). The term "UHD" refers to an image having a resolution of 4K*2K pixels or greater.

However, a camera device having the image signal processor and the application processor or a terminal having the camera function has difficulty in capturing an image having UHD resolution while photographing a moving image in a full HD resolution. This is because it is impossible for an image signal processor of a camera device in the prior art to transmit continuous image data having UHD resolution to an application processor at a desired time.

SUMMARY OF THE INVENTION

The present invention has been made in view of the above problems and provides additional advantages, by providing an apparatus and a method for capturing an image having UHD resolution photographed by a camera device or a terminal having a camera function at a desired point in time, and for selecting and storing a desired image from the photographed images having UHD resolution. To this end, a camera device or a terminal having a camera function according to an exemplary embodiment of the present invention processes images acquired from camera sensors to generate a plurality of images for each frame, and transmits the generated images in a set data transmission mode using a hybrid scheme to use the generated images as a preview image and a captured image.

The present invention further provides an apparatus and a method capable of capturing an image having UHD resolution while photographing moving images having full HD resolution in a camera device or a terminal having a camera capability. To achieve this, the exemplary embodiment of the present invention provides an apparatus and a method capable of generating images having UHD resolution acquired from a camera by an image signal processor for each frame as images having full HD resolution and compression images having UHD resolution, efficiently transmitting the images in a data transmission mode, and storing and capturing the images by an application processor as a moving image.

In accordance with an aspect of the present invention, a method of transmitting a frame image of a camera, includes: acquiring an image for each frame from a camera upon operation of the camera; generating the acquired image including a display image and compression images, transmitting the display image for each frame and transmitting the compression images at a preset frame interval; and displaying the acquired display image and buffering the compression images.

In accordance with another aspect of the present invention, a camera device includes: a camera; an image signal processor for acquiring a frame image for each frame from the camera upon operation of the camera, generating the acquired image including a display image and a compression image, transmitting the display image for each frame, and transmitting the compression image at a preset frame interval; an application processor for displaying the acquired display image and buffering the compression image; and a display unit for displaying the display image output from the application processor.

In accordance with another aspect of the present invention, a portable terminal apparatus includes: a communication unit for performing wireless communication with an external device; a terminal controller for controlling a call and communication of the portable terminal apparatus through the communication unit; a camera for acquiring an image from a camera sensor from each frame upon operation of the camera; an image signal processor for acquiring a frame image for each frame from the camera upon operation of the camera, generating the acquired image including a display image and a compression image, transmitting the display image for each frame, and transmitting the compression image at a preset frame interval; an application processor for displaying the acquired image display and buffering the compression image; and a display unit for displaying the display image output from the application processor.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
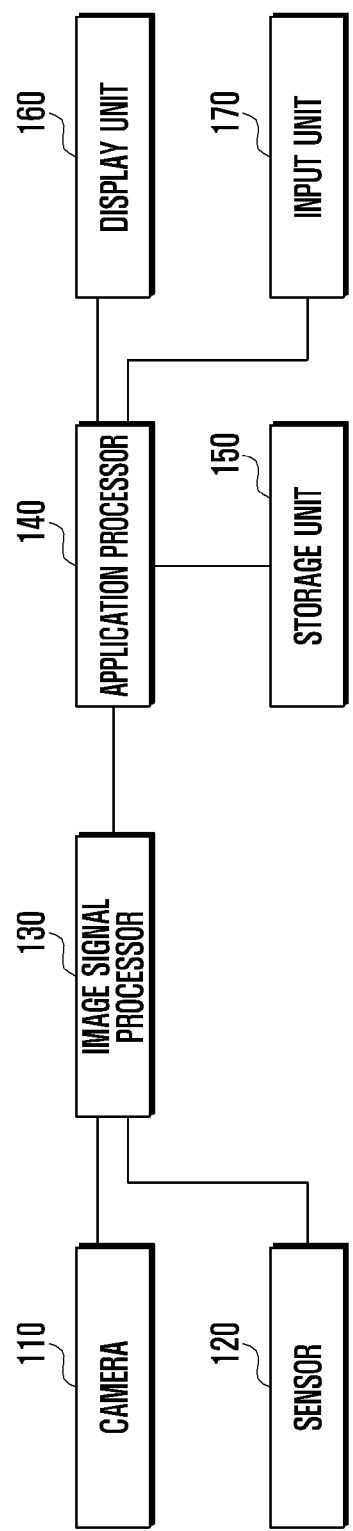
FIG. 1 is a block diagram illustrating a configuration of a camera device according to an exemplary embodiment of the present invention.

Exemplary embodiments of the present invention are described with reference to the accompanying drawings in detail. The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention. The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

The following description illustrates specific information such as the pixel number of an image or the size of data. Hence, for the purposes of clarity and simplicity, detailed descriptions of well-known functions and structures incorporated herein may be omitted to avoid obscuring the subject matter of the present invention.

Briefly, the present invention relates to a camera device or a portable terminal having a camera function, and may process images acquired by an image sensor of the camera to generate a plurality of images, and generate information acquired by the camera and/or sensors as photographed information. The images may include an image for preview (or preview and recording moving image) and a captured image while operating a camera. The photographed information may include information from a camera sensor and/or respective sensors when photographing an image in a corresponding frame during acquisition of the image from the camera, which may be incorporated with meta data and embedded data.

The display image may be a YUV image recorded as a preview image and a moving image, and may be controlled and/or modified to a suitable size, by cropping and/or scaling, so that the display image may be displayed on a display unit. The captured image may be a compression coded image as an image (e.g., image having full HD resolution or a resolution greater than the full HD resolution) acquired from the camera sensor, and will be described as a JPEG image in the exemplary embodiment of the present invention. The display image may be a YUV image having full HD resolution and a compression image is a JPEG image acquired by compression-encoding an image having UHD resolution. Further, the compression image refers to a compression image for storing a still image and thus, a captured image and the compression image refer to the same image.

The exemplary embodiment of the present invention provides an apparatus which generates a display image and a compression image for each frame by an image signal processor (ISP) upon operation of a camera, transmits the generated display image and compression image in an interleaved data mode to implement zero shutter-lag, receives the display image and compression image, records the display image and compression image as display and moving images by an application processor (AP), and captures a compression image corresponding to a frame at a point in time of a capture request while buffering the compression image to implement the zero shutter-lag, and a method thereof.

The photographed information includes camera sensor information with respect to every frame image acquired from the camera sensor upon operation of the camera and information generated from other sensors of the camera device. In general, a camera device includes information for setting the camera sensor, and such information may be Exchangeable Image File Format (exif) data. However, the information for setting the camera sensor may possibly be used only for an acquired image in which an amount of exif data is restrictive. Further, the exemplary embodiment of the present invention provides the apparatus and the method which store photographed information of every frame acquired from the camera sensor and/or other sensors of a device, such as the camera, and efficiently use sensor data using the stored photographed information.

The interleaved data mode refers to a mode which multiplexes the display image and the compression image for each frame to transmit the multiplexed image as one frame, which is a mode which multiplexes and transmits the display image, the compression image and the photographed information. That is, the exemplary embodiment of the present invention may multiplex only the display image and the compression image as necessary to transmit the multiplexed image as one frame, multiplex the display image, the compression image, and photographed information to transmit the first multiplexed result as one frame, and multiplex only the display image and the photographed information to transmit the second multiplexed result. That is, in the interleaved data mode, frame information may be configured by only the display image and the compression image, or by only the compression image and the photographed information. The exemplary embodiment of the present invention may have the frame information configured by the display image, the compression image, and the photographed information by way of example.

The hybrid interleaved data mode is a mode in which the display image is transmitted for each frame and the compression image is transmitted in units of two frame intervals or greater. The hybrid interleaved data mode may be determined by a bus bandwidth of the image signal processor and the application processor.

Hereinafter, the present invention will be described in detail with reference to the accompanying drawings, but it should be noted that the teachings of the present invention are applicable to any terminal having a camera function. A camera device will now be described by way of example.

FIG. 1 is a block diagram illustrating a configuration of a camera device according to an exemplary embodiment of the present invention.

Referring to FIG. 1, a camera 110 and a sensor 120 perform a function of acquiring an image by the sensor 120 when the camera 110 is activated. The sensor 120 may include at least one sensor mounted in the camera 110, which includes at least one of a Global Positioning System (GPS) receiver, a gyro sensor, an acceleration sensor, an altitude sensor, and a direction sensor.

An image signal processor 130 processes an image acquired from the camera 110 to generate a display image on a display unit 160 and a compression image to be stored in response to a capture request. The display image may include a YUV image. The image signal processor 130 color-converts the image acquired from the camera 110 and controls the size of the image to a size suitable for being displayed on the display unit 160, for example, by scaling and/or cropping. That is, the image signal processor 130 generates a YUV image, and may suitably set the YUV image according to a display capability of the display unit 160. Here, the YUV image may include an image displayed on the display unit 160 and an image recorded as a moving image. The exemplary embodiment of the present invention may be implemented such that the display image is an image having a full HD resolution.

Accordingly, the image signal processor 130 compresses an image output from the camera 110 in a still image coding scheme (e.g., a JPEG scheme). The compression image may be an image having a full HD resolution to be stored when a user requests capture of such image. The exemplary embodiment of the present invention may be implemented such that the compression image is a JPEG image acquired by compressing a YUV image having UHD resolution.

The image signal processor 130 acquires photographed information of the image from the camera 110 and the sensor 120. The photographed information may include various information which is additionally acquired as well as exif information which is acquired when the camera 110 photographs an image. That is,
the photographed information is comprised of various information including camera shooting information and sensed data of a sensor, as shown in Table 1. The Exchangeable image file format (Exif) is a standard that specifies the formats for images used by digital cameras. The image signal processor 130 may generate the display image and the compression image for each frame period and may generate the display image, the compression image, and the photographed information. The image signal processor 130 may generate a display image or a compression image having a frame rate of either 30 frames per second or 60 frames per second, or of any preset rate in frames per second (fps), and/or generate the display image, the compression image, and photographed information. Here, the photographed information may include information from a camera sensor and/or respective sensors when photographing an image in a corresponding frame during acquisition of the image from the camera. The photographed information is same word as meta data and embedded data in the present invention.

The image signal processor 130 multiplexes the generated display image and the compression image (or display image, compression image, and photographed information) as one frame for transmission in an interleaved data mode. In the exemplary embodiment, the image signal processor 130 transmits the frame information in the interleaved data mode or a hybrid data mode according to a multiplexed bus bandwidth, as explained in greater detail later.

The application processor 140 buffers a display image and a compression image, or the display image, the compression image, and photographed image. The application processor 140 controls the display unit 160 to display the display image upon operation of the camera 110. In a moving image photographing mode, the application processor 140 compresses the moving image and stores the compressed moving image in the storage unit 150. In the exemplary embodiment, if a capture request command is received from a user, the application processor 140 stores the compression image in the storage unit 150 when the capture request occurs to implement image capture with zero shutter-lag, as explained in greater detail later.

The input unit 170 responds to user selections and inputs to generate and provide a camera operation command, a capture command, and/or a moving image photographing command to the application processor 140. The input unit 170 may be a touch panel for detecting a touch input of the user. The input unit 170 may include at least one button or multiple buttons located on or accessible at the exterior of the camera 110.

The display unit 160 displays a display image output from the application processor 140 upon operation of the camera 110. The display unit 160 may display photographed information and/or thumbnail images. The display unit 160 may be a LCD or an OLED for displaying data and images generated during the execution of a program. The input unit 170 and the display unit 160 may be implemented as an integral touch screen. The storage unit 150 stores a buffered compression image from the application processor 140 upon receiving a capture request from the user.

Figure 2:
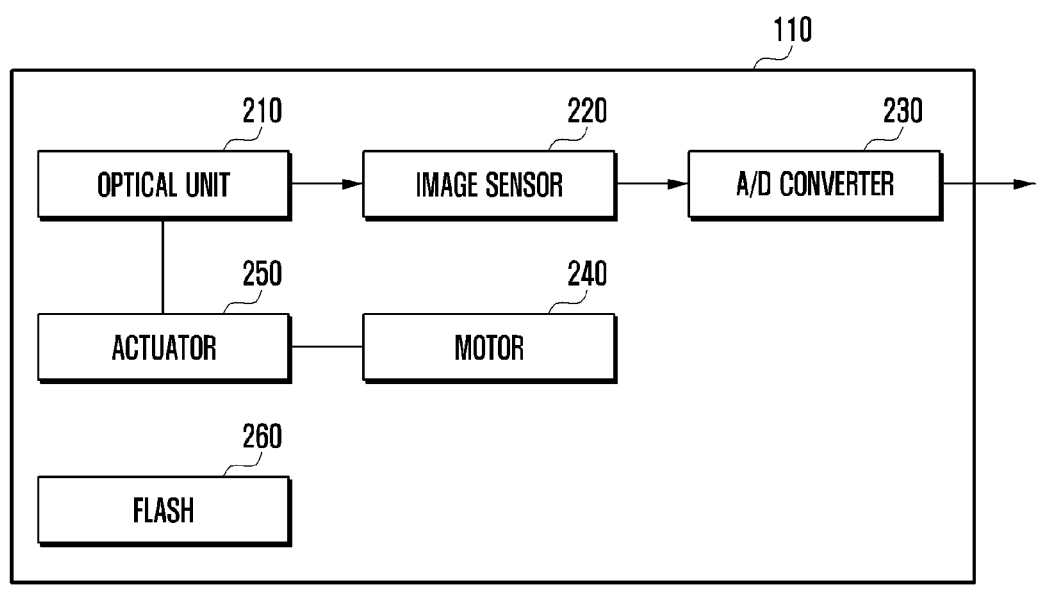
FIG. 2 is a block diagram illustrating a configuration of the camera device according to the exemplary embodiment of the present invention.

FIG. 2 is a block diagram illustrating a configuration of the camera 110 according to the exemplary embodiment of the present invention.

Referring to FIGS. 1 and 2, if a camera operation command occurs, operation power is supplied to the camera 110. The image signal processor 130 drives or operates a motor 240, and an actuator 250 controls the operation of an optical unit 210 according to operation of the motor 240. The optical unit 210 may perform an operation such as zoom or focusing via the actuator 250. The optical unit 210 images a peripheral image and an image sensor 220 detects an image imaged by the optical unit 220, and generates and/or converts a detection signal into an electric signal. The image sensor 220 may be an image sensor having a resolution greater than a full HD resolution. The image detected by the image sensor 220 is converted into a digital image by an A/D converter 230, and the digital image is transferred to the image signal processor 130. Further, a flash 260, such as a flash bulb or other lighting devices, may be operated by the image signal processor 130.

Figure 3:
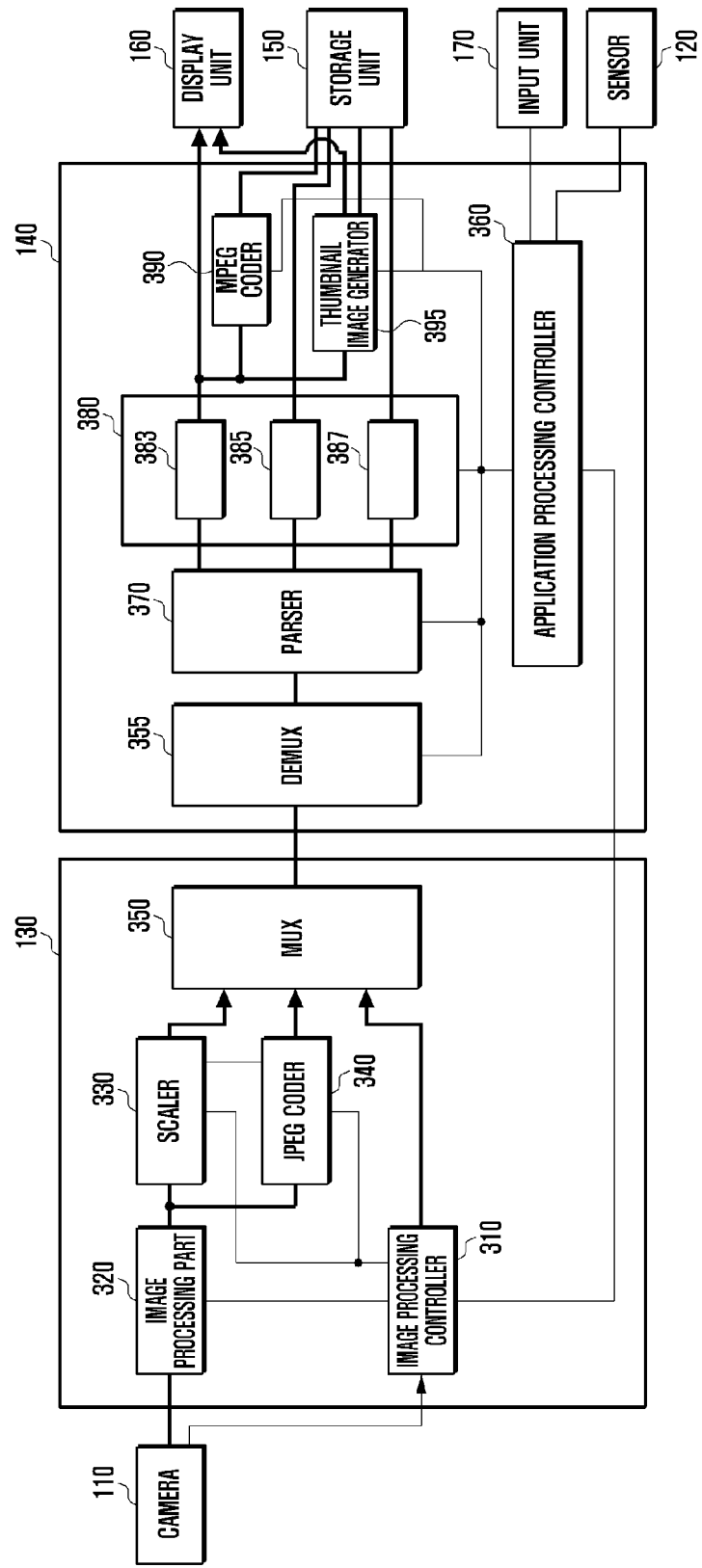
FIG. 3 is a block diagram illustrating configurations of an image signal processor and an application processor according to the exemplary embodiment of the present invention.

FIG. 3 is a block diagram illustrating configurations of the image signal processor 130 and the application processor 140 shown in FIG. 1, according to the exemplary embodiment of the present invention.

Referring to FIG. 3, an image processing part 320 of the image signal processor 130 converts an image output from the camera 110 into a YUV image. The image processing part 320 can include a pre-processing part and a post-processing part. In such case, the pre-processing part pre-processes an image acquired from the camera 110. The preprocessing operation includes an extraction and processing of 3A (auto white balance (AWB), auto exposure (AE), auto focusing (AF)), lens shading correction, dead pixel correction, knee correction and etc. The post-processing part performs at least one of color interpolation, noise removal, color compensation, and color transformation on the pre-processed image and generates a YUV data. The image output from the camera 110 is a raw image and has a number of pixels greater than full HD resolution detected by the image sensor 220. The image signal processor 130 includes a still image compressor 340, such as a still image coder, for compressing data and storing the still image in response to a capture request. The still image compressor 340 may use various known still image coding methods such as JPEG and TIFF. The exemplary embodiment of the present invention may be implemented such that the still image compressor 340 is a JPEG coder 340, as shown in FIG. 3. The JPEG coder 340 compresses an image output from the image processing part 320 into a JPEG image.

A scaler 330 scales an image output from the image processing part 320 to an image of a suitable size to be displayed on the display unit 160. The scaler 330 may include elements or a part thereof for scaling, cropping, and/or resizing the image data. When the image processing part 320 does not perform a color conversion function, the scaler 340 may be configured by a display image generator, which may be configured by a color converter for converting a raw image into a YUV image and a scaled image.

An image processing controller 310 controls the operation of the camera 110 under control of the application processing controller 360, and controls an overall operation of the image signal processor 130 in a camera operation mode. Upon operation of the camera 110, the image processing controller 310 may generate photographed information of an image photographed by the camera 110. When the sensor 120 is connected to the image signal processor 130, the image processing controller 310 may input setting information and may communicate an output of the camera 110 to other components, such as a multiplexer 350, as well as information generated from the sensor 120 to generate the photographed information. The image processing controller 310 may include an internal memory. When transmitting the display image and the compression image, or the display image, the compression image, and the photographed information in an interleaved scheme, the compression image may be included in each frame according to a bus bandwidth. Alternatively, the compression image may be included at a preset frame interval, and the compression image may be transmitted only at the preset frame interval.

The compression image, the display image, and/or the photographed information are generated for each frame, and the frame may be configured to have a frame rate of 30 frames or 60 frames for one second, or any other preset frame rate. The multiplexer 350 multiplexes the compression image, the display image, and/or the photographed information as one frame and transmits the multiplexed image to the application processor 140 according to an interleaved scheme. In this case, the multiplexer 350 may perform a hybrid interleaved data mode transmitting the compression image for each preset frame under control of the image processing controller 310, as explained in greater detail later.

Although not shown in FIG. 2, the image signal processor 130 may further include a thumbnail image generator for converting the display image into a thumbnail image. To this end, the image signal processor 130 may generate the thumbnail image based on the display image and the JPEG coder 340 may compress an output image of the image processing part 310, then generate an output configured by a header, the thumbnail image, and the compressed JPEG image.

The following is a configuration of an exemplary embodiment of the application processor 140. The application processing controller 360 controls an operation of the image signal processor 130 according to a command from the input unit 170, buffers an image output from the image signal processor 130 to display the buffered image through the display unit 160, and stores the buffered compression image in the storage unit 150. A demultiplexer 355 demultiplexes and outputs the display image, the compression image, and/or the photographed information from the image signal processor 130 under control of the application processing controller 360. A parser 370 parses and separates the images and information demultiplexed by the demultiplexer 355 as the display image, the compression image, and the photographed information. In an alternative exemplary embodiment, the application processing controller 360 controls the demultiplexer 355 to software-parse an output of the image signal processor 130 as the display image, the compression image, and/or the photographed information, and so in the alternative exemplary embodiment, the parser 370 may be omitted.

A buffer 380 may include a display image buffer 383, a compression image buffer 385, and/or a photographed information buffer 387. The buffer 380 buffers the parsed display image, compression image, and photographed information under the control of the application processing controller 360. The buffer 380 has a size capable of buffering a display image, a compression image, and photographed information of N frames. The structure of the buffer 380 may have a ring buffer structure. The reason to configure the buffer 380 with a ring buffer structure is to maintain the received image and information of each frame for a particular number of frames.

The application processor 140 may include a moving image compressor 390, such as a moving image coder, for compressing the display image to a moving image when a storage of the moving image is requested, and the moving image compressor 390 may be configured by various moving image coders known in the art, such as H.264 or MPEG. In the exemplary embodiment of the present invention, the moving image compressor 390 may comprise an MPEG coder 390 shown in FIG. 3. If the storage of a moving image is requested by the user, the application processing controller 360 operates the MPEG coder 390, and the MPEG coder 390 compresses the display image buffered by the display image buffer 383 of the buffer 380 and stores the compressed display image in the storage unit 150. The application processor 140 further include a thumbnail image generator 395 which resizes the display image to generate a thumbnail image. The thumbnail image generator 395 may resize a display image output from the display image buffer 383 to generate a thumbnail image so that the thumbnail image may be included as a JPEG image, which may be displayed on the display unit 160 under the control of the application processing controller 360.

The application processor 140 may capture a still image during a preview mode or during a moving image photographing mode. Upon operation of the camera, regardless of an operation mode of the application processor 140, the image signal processor 130 continuously generates and transmits a display image and a compression image (or display image, captured image, photographed information) in an interleaved data mode, Accordingly, the application processor 140 may continuously receive the compression image and the display image. FIG. 3 illustrates coders as a constituent element for compressing a still image and a moving image included in the image signal processor 130 and the application processor 140. However, a configuration of compressing an image and releasing the compressing may be integrated as a single chip, which may be a Coder and DECoder (CODEC). Accordingly, the still image coder 340 (e.g., the JPEG coder 340) may be a still image CODEC (JPEG CODEC). A moving image coder 390 (e.g., the MPEG coder 390) of the application processor 140 may be a moving image CODEC (MPEG CODEC).

Hereinafter, the exemplary embodiment of the present invention will be described based on an operation of displaying and compression-storing an image photographed by the camera 110. If compression-storing of images is performed, there is a need to perform image decoding and/or data retrieval or releasing from storage and decompression of the compressed image, and displaying a still image (e.g., JPEG image) stored in the storage unit 150. To this end, although not shown in the drawings, the application processor 140 may further include a still image decoder (or still image CODEC). Thus, if the user requests a playback of a compressed image stored in the storage unit 150 via the input unit 170, the application processor 140 may decode (compression-releases) a compressed image through a still image decoder (still image CODEC) which is not shown, and display the decoded image on the display unit 160.

In operation, the image signal processor 130 may receive an image output from the camera 110 to generate a display image for preview and a compression image for capture, and generate a display image, a compression image, and photographed information.

When the user inputs and/or generates a camera operation command via the input unit 170, the application processing controller 360 informs the image signal processor 130 of the camera operation command, and the image processing controller 310 operates the camera 110. The image output from the camera 110 is inputted to an image processing part 320. The camera operation command may initiate performing a capture mode while performing a preview mode, a moving image photographing mode, a still image capture mode, and/or a moving image photographing mode.

The image signal processor 130 generates a display image, a compression image, and photographed information at every frame period. Generation of a frame image by the image signal processor 130 may be achieved at a frame rate of 30 fps or greater (e.g., 60 fps), or any preset frame rate. In this case, the image processing part 320 3A-processes a raw image received from the camera 110, performs color interpolation and/or performs color conversion of the raw image into a YUV image for every frame period. The image may be an image having a full HD resolution or greater. The JPEG coder 340 compression-encodes an image output from the image processing part 320 in a JPEG scheme to generate a compression image for being stored upon a capture request. In this case, the compression data may be generated using a compression coder of another scheme such as JPEG. As described above, the exemplary embodiment of the present invention may be implemented such that the compression data are generated in a JPEG scheme. The scaler 330 reduces an image output from the image processing part 320 to a preset data size to generate a display image for preview to be displayed on the display unit 160. A method of reducing the image may include a typical scaling method, a cropping method, and a resizing method. A display image may be generated by one or a combination of at least two of the foregoing methods, or any other known image scaling methods. The display image may include an image to be displayed on the display unit 160 and/or an image to be stored upon moving image capture. In this case, the scaler 330 of the image signal processor 130 may control data sizes of a display image for a preview mode and a display image for storing a moving image to a different size. As described above, when the image processing part 302 does not perform a color conversion function, the scaler 340 may be configured by a display image generator. In this case, the display image generator may have a configuration including a color conversion function (function of converting a raw image into a YUV image) and a scaling function.

The image signal processor 130 acquires various sensor information when photographing the display image at every frame period and an image by the camera 110 upon generation of the compression image to generate various sensor information as photographed information. The photographed information includes outputs of the camera 110 and the sensor 120. In this case, when the sensor 120 is connected to the image signal processor 130, the image signal processor 130 may generate photographed information using information of a photographing time point acquired by the camera 110 and the sensor 120. However, as shown in FIGS. 1 and 2, when the sensor 120 is connected to the application processor 140, the image signal processor 130 may first generate photographed information using information acquired by the camera 110, the application processor 140 generates second photographed information using information acquired by the sensor 120, and combines the second photographed information with the first photographed information to generate the photographed information.

An image signal processor 130 and/or an application processor 140, receiving an image every frame generated from the camera 110, generate a YUV image for display and a compression image for capture, and generate photographed information of a corresponding frame image (configured by image data and embedded data). The embedded data may include data and information, as meta data, as illustrated in the following Table 1.

TABLE 1

| Photographed information (meta data) | Size | Remarks |
| --- | --- | --- |
| Flash | 4 byte | Flag capable of checking full light amount of flash, use when flash operates |
| ISO | 4 byte | Store ISO information |
| EV | 4 byte | Store Exposure Value |
| Data type | 4 byte | Store data type of JPEG, YUV, meta data |
| Data size | 4 byte | Store the size of variably changed JPEG, use when JPEG image is stored in a buffer |
| Face detection | 4 byte | Store face detection function on/off |
| Face number | 4 byte | Store the number of recognized faces |
| FD start x | 4 byte | Store start x value of square coordinate in which a face is recognized. Store the number of recognized faces like FD[0].sx, FD[1].sx |

TABLE 1-continued

| Photographed information (meta data) | Size | Remarks |
|---|---|---|
| FD start y | 4 byte | Store start y value of square coordinate in which a face is recognized. Store the number of recognized faces like FD[0].sy, FD[1].sy |
| FD end x | 4 byte | Store start x value of lower right of square coordinate in which a face is recognized. Store the number of recognized faces like FD[0].ex, FD[1].ex |
| FD end y | 4 byte | Store start y value of lower right of square coordinate in which a face is recognized. Store the number of recognized faces like FD[0].ey, FD[1].ey |
| Effect | 4 byte | Store set Effect value |
| White balance | 4 byte | Store set white balance value |
| Scene mode | 4 byte | Store set Scene mode value |
| Metering | 4 byte | Store set light metering mode value |
| I-frame | 4 byte | Store iframe information upon use of MPEG |
| P-frame | 4 byte | Store pframe information upon use of MPEG |
| Sharpness | 4 byte | Store set sharpness value |
| Saturation | 4 byte | Store set saturation value |
| Contrast | 4 byte | Store set contrast value |
| Frame count | 4 byte | Store count value of current input frame |
| HDR | 4 byte | Store HDR operation state |
| Zoom | 4 byte | Store set zoom magnification |
| AF | 4 byte | Store AF status |
| CAF x | 4 byte | Store x coordinate during CAF operation |
| CAF y | 4 byte | Store y coordinate during CAF operation |
| Gyro data | 4 byte | Store Gyro data, use upon determination of shake |
| Anti-shake | 4 byte | Store presence of hand shake prevention function operation |
| Quality | 4 byte | Store set JPEG quality |
| Storage | 4 byte | Store media data storage location |
| Photographing date | 4 byte | Store current time information |
| GPS information | 4 byte | Store GPS status |
| Location information | 4 byte | Store current location data |
| Altitude information | 4 byte | Store current altitude information |
| Camera angle information | 4 byte | Store current camera angle information |
| Acceleration information | 4 byte | Store acceleration sensor data, use upon determination of shake |

The user may set various functions to take a photograph using the foregoing photographed information (meta data). The user may search for a preset value meeting a situation using frequently photographed subject information and camera menu information. In this case, if a human face is detected upon preview, a menu frequently used upon photographing a corresponding person accesses a person database (DB) or a menu which provides an excellent result upon use is automatically set.

For example, a camera user photographs other people such as their family, relations, lover, and talented people such as artists and movie stars. When searching for suitable information or if there is no suitable information upon photographing a corresponding person in a person DB, the user may set a menu to assist in setting photograph parameters during photographing (e.g., smile shot, beauty shot, portrait scene mode, AF mode, object tracking, ISO, effect, white balance, exposure, metering, zooming, flash, etc.). When the user cannot search for person information from the preview information, the user may confirm at least some settings with respect to whether the camera 110 is photographing scenery photograph to be suited to a scenery photograph (e.g., outdoor visible, flash, ISO, effect, white balance, exposure, metering, landscape scene mode, Fan focus mode, etc.). The photographed image may be stored based on an experience with respect to the user profile; for example, in a case of a romantic photograph, the image may be stored simultaneously with photographing as a romantic album or to be reflected, copied, transmitted and/or saved to a designated social networking service (SNS) or a cloud-based storage and distribution system. When similarity of a photographed image in a continuous photographing session of consecutively captured images is determined and is displayed to the user in an album or during post-capture viewing of the photographs, the photographed image may be easily confirmed.

The multiplexer 350 multiplexes the display image, the compression image, and the photographed information in an interleaved data mode to be output in one frame to the application processor 140.

Figure 4:
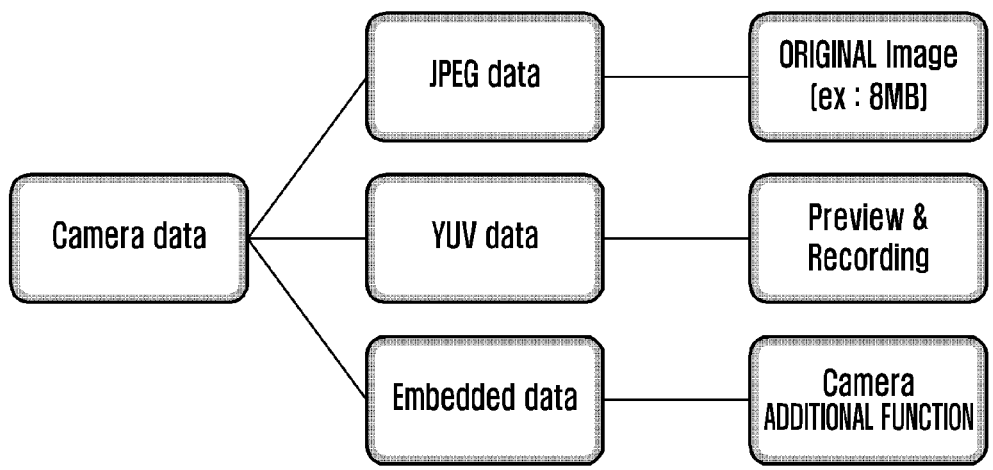
FIG. 4 is a diagram the organization of image data according to the exemplary embodiment of the present invention.
Figure 5A:
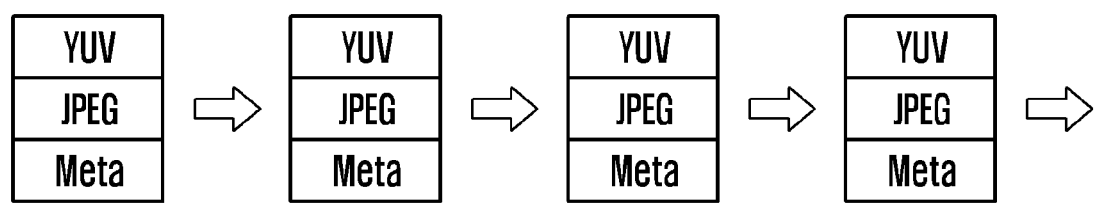
FIGS. 5a to 5f are diagrams illustrated a data transfer format according to the exemplary embodiment of the present invention.

FIG. 4 is a diagram illustrating the organization of image data in the exemplary embodiment of the present invention, with camera data including YUV data, JPEG data, and embedded data forming a YUV image, a JPEG image, and photographed information, respectively, constituting one frame according to the exemplary embodiment of the present invention. FIGS. 5a to 5f are diagrams illustrated a data transfer format according to the exemplary embodiment of the present invention. More specifically, FIG. 5a illustrates a transfer format of an interleaved data mode. FIGS. 5b to 5f are views illustrating a transfer format of a hybrid interleaved data mode.

Figure 5B:
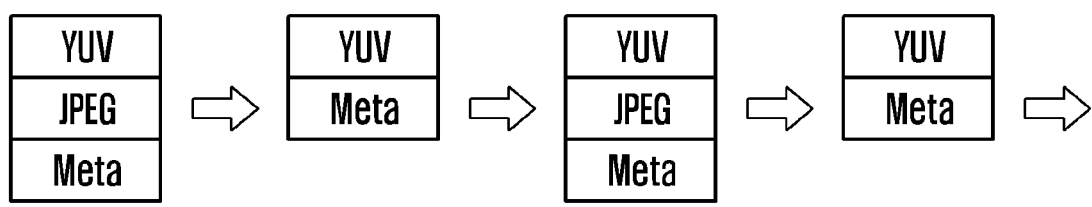
Figure 5C:
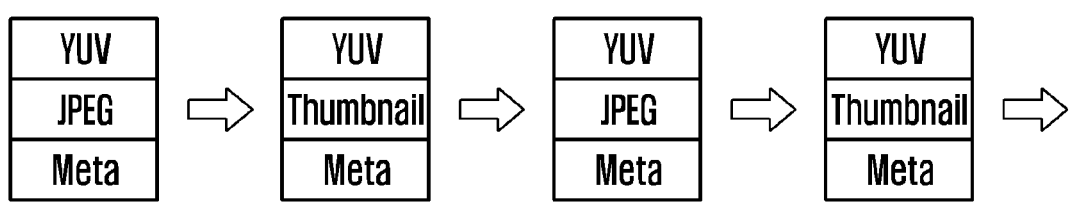
Figure 5D:
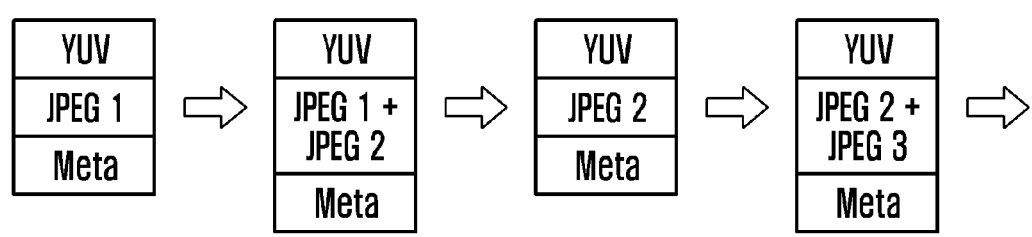
Figure 5E:
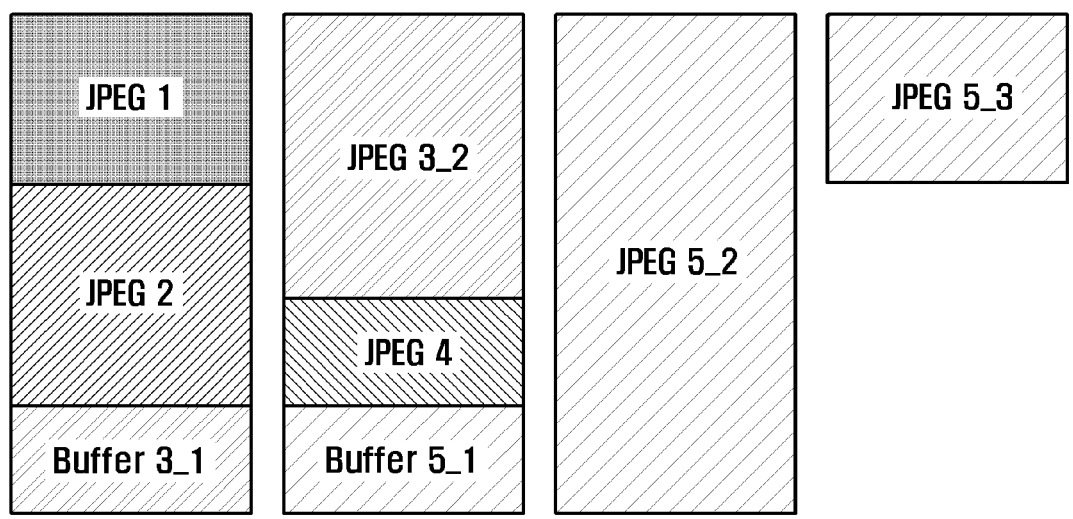
Figure 5F:
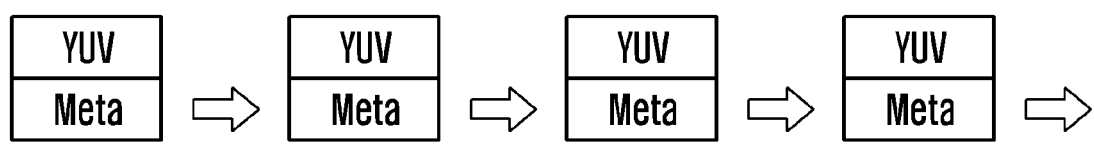

Referring to FIGS. 4 to 5f, the image signal processor 130 generates YUV data of a YUV image, JPEG data of a JPEG image, and embedded data and/or meta data as photographed information for additional camera functions. The multiplexer 350 multiplexes the generated YUV image, JPEG image, and photographed information in the format of FIG. 4 and transmits the multiplexed data to the application processor 140. As shown in FIG. 4, JPEG data representing the compression image conveys an original image having UHD resolution acquired from the camera 110, which are data to be stored as a still image upon a capture request. The size of the JPEG data may be determined by an image sensor 220 of the camera 110, and may have a data size, for example, equal to or greater than 8 M bytes. The YUV data represents an image to be previewed by being output to the display unit 160 and/or for recording images, and are scaled to a size smaller than the size of the JPEG data. The YUV data may be used as data to be stored as a moving image other than a preview image. That is, display images stored in the display image buffer 383 are compressed by the MPEG coder 390 while being displayed on the display unit 160 and the compressed display image may be stored in the storage unit 150. The photographed information may be configured by various settings when acquiring an image by the camera 110 and sensor information detected by a sensor 120 located internal to or external to the camera 110. Thus, the photographed information is not included in the compression image but is independently stored. That is, the image signal processor 130 generates photographed information using information detected from the camera 110 and the sensor 120. The photographed information is stored corresponding to the display image and the compression image for each frame. In this case, as illustrated above, information capable of being acquired from the sensor 120 is generated by the application processor 140, and may be merged when the application processor 140 buffers photographed information. Thereafter, the user may efficiently store and process an image using the photographed information.

The camera frame data according to the exemplary embodiment of the present invention, having an example structure shown in FIG. 4, is generated by the image signal processor 130, and the generated camera frame data are transmitted to the application processor 140 in a transfer format as shown in FIGS. 5a to 5f. In this case, the image signal processor 130 multiplexes the display image, the compression image, and the photographed information in a single frame, and transmits the single frame to the application processor 140. In other words, the image signal processor 130 converts the frame images and information into parallel data, converts the frame images and information into serial data, and transmits the serial data to the application processor 140. In this case, the YUV data may be 2 MB ((Full HD): 1920*1080*2 (YUV 422 format is 2 Bytes per pixel)). The JPEG data may represent an image obtained by compression-encoding a UHD image. Meta data, being the photographed information, may be stored in 4K bytes. In this case, a bus bandwidth, necessary when the image signal processor 130 transmits images and information of each frame as illustrated in FIG. 4 to the application processor 140 in a data transfer format as illustrated in FIG. 5a, may be (1920*1080*2+8*1024*1024+4*1024)*30 fps*8 bit=3,009,576,960 bps=2.87 Gbps. However, when a maximum bandwidth of the image signal processor 130 or the application processor 140 does not support such data rates, for example, in the case of a QUALCOMM 8960 chipset, because the maximum bandwidth is 2.56 Gbps, and 15% margin is required, an actual transmission bandwidth may be 2.716 Gbps, and so the interleaved data transmission mode as illustrated in FIG. 5a cannot be used. When the image signal processor 130 and/or the application processor 140 does not completely support the interleaved data in an overload state, that is, a state having a limitation to allocation of the bus bandwidth, the interleaved data transmission mode as shown in FIG. 5a may not be used.

In the exemplary embodiment of the present invention, the compression image is an image to implement zero shutter-lag upon capture of a still image, and the display image is an image displayed on the display unit 160 and MPEG coded and stored in the storage unit 150 in a moving image photographing mode. In this case, when the display image is transmitted in a hybrid scheme, there is inconvenience when the user is required, in the prior art, to confirm an image photographed or previewed on a screen. In particular, a frame rate of a recorded image is changed in the moving image photographing mode. Accordingly, it may not be suitable to control the display image in the hybrid interleaved data mode. However, the compression image is an image used in the present invention to implement the zero shutter-lag when capturing a still image, and is buffered in the application processor 140. If the user generates a capture command, a compression image of a frame corresponding to a generated time point of the capture command among the buffered compression images is accessed and stored as a still image. Accordingly, if the compression image is suitably transmitted in an interleave scheme, the still image may be acquired with zero shutter-lag to satisfy a bus bandwidth necessary between the image signal processor 130 and the application processor 140.

Accordingly, the exemplary embodiment of the present invention sets a bus bandwidth in which the image signal processor 130 transmits the compression image in a hybrid interleaved scheme. FIGS. 5b to 5f illustrate implementation examples of a hybrid data mode according to the exemplary embodiment of the present invention.

FIG. 5b illustrates a method which transmits a YUV image and photographed information for each frame, and transmits the compression in a first frame (or second frame) at two frame intervals. Thus, when one compression image is transmitted in units of two frames and a frame rate is 30 fps, the compression image has a structure which is transmitted at a frame rate of 15 fps. If the YUV image is 2 MB ((Full HD): 1920*1080*2 (in a case of YUV 422 format, 2 Bytes per pixel)), the compression image has an average 4 MB (JPEG: Max 8 MB+0 MB, average 4 MB), and the photographed information is 4K (Meta: 4K), a bandwidth necessary to transmit the image at a frame rate of 30 fps in a hybrid scheme is 1.717 Gbps ((1920*1080*2+4*1024*1024+4*1024)*30 fps*8 bit=2002944000 bps=1.717 Gbps). When the image has a frame rate of 30 fps, the bandwidth becomes 60% of the interleaved data mode as illustrated in FIG. 5a.

FIG. 5c illustrates an example of a hybrid interleaved data mode which transmits a YUV image and photographed information for each frame, transmits a compression image in a first frame (or second frame) and a thumbnail image in another frame at two frame intervals. Hence, when one compression image is transmitted in units of two frames and a frame rate is 30 fps, the compression image has a structure in which the image is transmitted at a frame rate of 15 fps. When the YUV image has 2 MB ((Full HD): 1920*1080*2 (in a case of YUV 422 format, 2 Bytes per pixel)), the compression image and the thumbnail image have an average of 4.15 MB ((JPEG: Max 8 MB+300 KB (Max Thumbnail size): average 4.15 MB), and the photographed information is 4K (Meta: 4K), a bandwidth necessary to transmit the image at a frame rate of 30 fps in a hybrid scheme becomes 1.946 Gbps ((1920*1080*2+4.2*1024*1024+4*1024)*30 fps*8 bit=2040,692,736=1.946 Gbps). When the image has a frame rate of 30 fps, the bandwidth becomes 68% of the interleaved data mode as illustrated in FIG. 5a.

FIG. 5d illustrates an example of a data division transmitting method which transmits the YUV image and photographed information for each frame and makes the compression image to have the same size and transmits the compression image. As described above, the compression image may be an image obtained by compressing a YUV image having UHD resolution. In this case, the compression image may have a variable data size according to the image photographed by the camera 110. That is, the data size of a compression image generated in each frame has different sizes according to the image. Accordingly, the compression image may be transmitted by making the compression image to have the same size for each frame. In this case, the image signal processor 130 includes a memory and appropriate software or instructions to divide data to have substantially or exactly the same size.

The image processing controller 310 of the image signal processor 130 may divide a container part (e.g., JPEG container) of the compression image as illustrated in FIG. 5e in the memory, and averages an MIPI limit and transmit data. In this case, if a bandwidth is sufficient and JPEG data is small (JPEG1, JPEG4 of FIG. 5e) upon division of the data, a plurality of JPEG images are simultaneously transmitted to one frame. When the JPEG image is large, such as the block of image data labeled JPEG 5_2 of FIG. 5e, the JPEG image is divided into a plurality of frames and the frames are transmitted so that the problem of the MIPI transmission limit may be solved. In this case, the memory may be set to the size of a compression image to be transmitted for each frame. The image processing controller 310 divides a compression image including header information, which is information indicating start and end of a corresponding compression image, having a boundary of a compression image of each frame. Note that the MIPI alliance stand for camera serial interface CSI-2 is explained in the following site, www.mipi.org.

FIG. 5*f* illustrates an example when resolution of a captured image set by the user is lower than the resolution of the display image. In this case, it is unnecessary to transmit the compression image, and so, as shown in FIG. 5*f*, the image signal processor 130 transmits only the display image and the photographed information. When the capture of an image is requested in the application processor 140, the image signal processor 130 generates the display image as a compression image. In this case, because the display image is buffered, the image signal processor 130 may implement zero shutter-lag upon image capture. In this case, the bandwidth is 0.950 Gbps ((1920*1080*2+4*1024)*30 fps*8 bit=0.950 Gbps). When the bandwidth has a frame rate of 30 fps, it becomes 33% of the interleaved data mode as illustrated in FIG. 5*a*.

When performing the hybrid interleaved data mode, a frame interval transmitting the compression image may be set to two frames or greater. If the frame interval is large, a transmission bandwidth may be reduced but the zero shutter-lag may not be exactly implemented. Accordingly, it is preferable that an interval of transmitting the compression image is suitably set as necessary.

Referring back to FIG. 3, the multiplexed and transmitted display image, compression image, and photographed information are demultiplexed by the demultiplexer 355 of the application processor 140. The demultiplexed image and information are parsed by the parser 370 and are buffered by the display image buffer 383, the compression image buffer 385, and the photographing information buffer 387 of a ring buffer 380. The buffer 380 has a structure of a ring buffer. If data having the set number of frames are buffered, such data are overwritten. The buffers 383, 385, and 387 have N ring buffer structures capable of storing corresponding data of N frames, respectively, and buffer corresponding data under the control of the application processing controller 360. In this case, data are buffered in N buffers, and the application processing controller 360 overwrites the data so that the data may be again buffered from the beginning. In this case, in the compression image buffer 385, N buffers capable of storing a JPEG image of N frames are linked with each other by a ring buffer structure, and JPEG images may be stored in corresponding buffers according to a transmitted data mode as illustrated in FIGS. 5*a* to 5*f*. Frames of the display image buffer 383, the compression image buffer 385, and the photographing information buffer 387 are synchronized with each other according to a frame count value. Accordingly, the application processing controller 360 may confirm a frame count value to a display image, a compression image, and photographed information of the same frame.

The application processing controller 360 buffers the display image in the display image buffer 383 and outputs the display image to be displayed as a preview image. In a moving image photographing mode, the display image buffered in the display image buffer 383 is transferred to the MPEG coder 390, and the MPEG coder 390 codes a received display image and stores the coded display image in the storage unit 150. In the state as described above, if the user generates a capture request command, the application processing controller 360 detects the capture request command and stores a set or selected compression image among the compression images buffered in the compression image buffer 385 in the storage unit 150. In this case, as shown in FIGS. 5*b* and 5*c*, when data are transmitted in a hybrid interleaved data mode, the application processing controller 360 may implement the zero shutter-lag by selecting and storing a buffering compression image of a frame closest to, or substantially adjacent to or subsequent to, another frame in time when the capture command is generated. When the data are transmitted in a hybrid interleaved data mode as illustrated in FIG. 5*d*, the application processing controller 360 confirms a frame when the capture is requested, confirms frame count information of a JPEG image stored by dividing data, and accesses and stores a buffered compression image of the confirmed frame in the storage unit 150. In this case, when the JPEG image is divided (for example, JPEG image 3 and JPEG image 5_2 and JPEG image 5_3 in FIGS. 5*d* and 5*e*, respectively), the application processing controller 360 couples the divided compression images and stores the coupled compression images. The stored compression image may be a JPEG image. In this case, the stored compression image may include a JPEG header, a thumbnail image, and a JPEG image.

Figure 6:
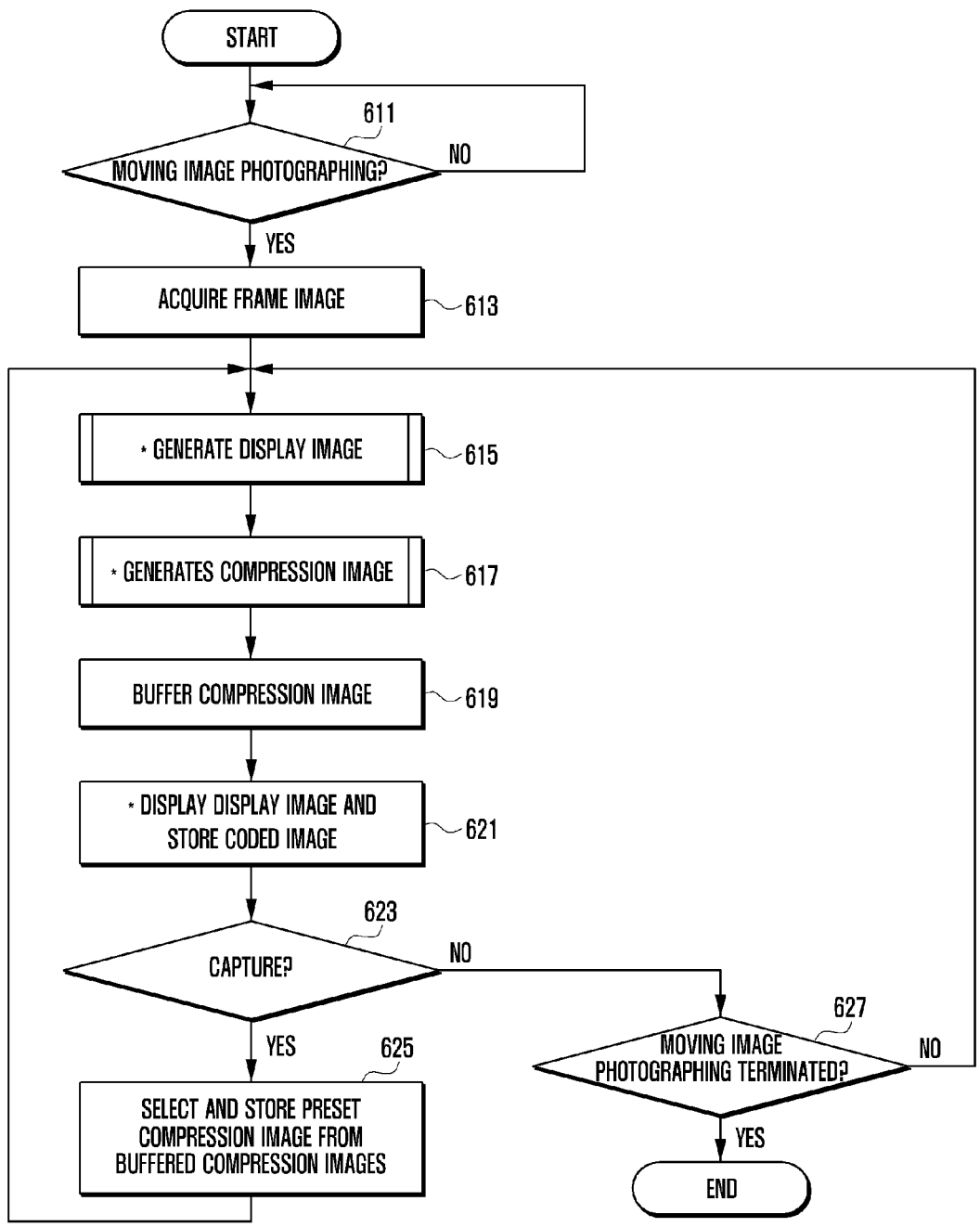
FIG. 6 is a flowchart illustrating a method of generating and processing a display image and a compression image for each frame by a camera device according to the exemplary embodiment of the present invention.

FIG. 6 is a flowchart illustrating a method of generating and processing a display image and a compression image for each frame by the camera 110 according to the exemplary embodiment of the present invention.

Referring to FIG. 6, if a camera operation request is inputted from an input unit 170, an application processor 140 detects and informs the image signal processor 130 of the camera operation request, and the image signal processor 130 operates the camera 110. In this case, the image signal processor 130 operates the camera according to preset information (e.g., focus, zoom, white balance) of the camera 110.

If the camera 110 is operated, the camera 110 performs a preview mode. As described above, the user may request a moving image photographing in a state of performing the preview mode. In this case, if the user requests the moving image photographing, the application processor 140 detects the request in step 611. If moving image photographing mode is not requested, the method loops back to step 611. However, if the moving image photographing mode is requested in step 611, the method performs a moving image photographing mode in subsequent steps. However, if the camera 110 is operated, the image signal processor 130 performs the same operation regardless of a preview mode, a capture mode, and a moving image photographing mode. Accordingly, if the camera 110 is operated, the image signal processor 130 acquires an image from the camera 110 in step 613. In this case, the camera 110 photographs images having a full HD resolution or greater which may be an image having UHD resolution, and the image signal processor 130 acquires a frame image in step 613. In this case, the image signal processor 130 acquires the image at a preset frame rate, and the frame rate may be 30 fps. After acquiring the frame image, the image signal processor 130 generates a display image in a corresponding frame in step 615, and generates a compression image in step 617. In this case, as illustrated above, the compression image is determined according to the bus bandwidths of the image signal processor 130 and the application processor 140, and an interleaved data mode is used according to the determined bandwidths. In this case, the interleaved data mode may be one of transmitting methods as illustrated in FIGS. 5*a* to 5*f*.

Figure 7:
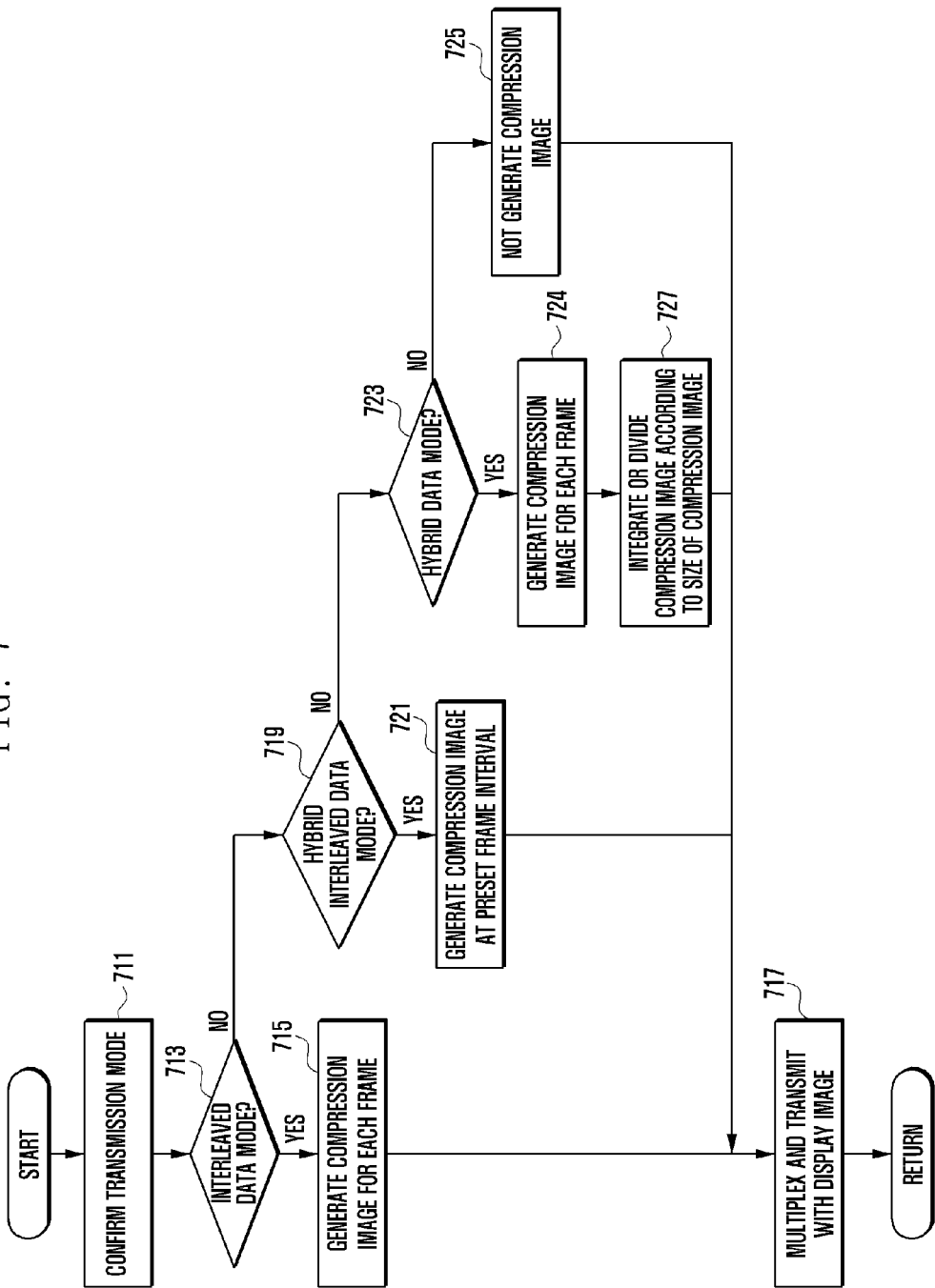
FIG. 7 is a flowchart illustrating a method of generating the compression image shown in FIG. 6.

FIG. 7 is a flowchart illustrating a method of generating the compression image in step 617 of FIG. 6.

Referring to FIG. 7 in conjunction with FIGS. 5*a*-5*f*, the image signal processor 130 confirms a transmission mode in step 711. In this case, if the bandwidth is sufficient, the image signal processor 130 detects an interleaved data mode in step 713. If the interleaved data mode is not detected, the method proceeds to step 719. Otherwise, if the interleaved data mode is detected in step 713, the method generates a compression image for each frame as illustrated in FIG. 5a in step 715, multiplexes the compression image with the display image, and transmits the multiplexed image in step 717, and returns to complete step 617 in FIG. 7.

Referring back to step 719, when a system bandwidth is not sufficient, the image signal processor 130 detects the condition of insufficient bandwidth, and determines whether a current mode is a hybrid interleaved data mode which transmits the compression image at a predetermined frame interval in step 719. When the current mode is the hybrid interleaved data mode, in step 721, the image signal processor 130 generates a compression image at a frame interval set as illustrated in FIGS. 5b and 5c, and the method proceeds to step 717.

Otherwise, in step 719, when the current mode is not the hybrid interleaved data mode, the method proceeds to step 723 to detect if the current mode is a hybrid data mode dividing data in step 723. If the image signal processor 130 detects the hybrid data mode in step 723, the method proceeds to step 724 and generates a compression image for each frame in step 723. The image signal processor 130 integrates or divides the generated compression image of a frame according to the size of the compression image in a memory in step 727, and proceeds to step 717. That is, as shown in FIG. 5e, if the size of the compression image is small; that is, below a predetermined threshold size, the image signal processor 130 integrates a compression image of a plurality of frames in one frame to make a frame compression image. If the size of the compression image is large, the image signal processor 130 divides the compression image of a corresponding frame so that the compression image is separately transmitted to the frames. Referring back to step 723, if hybrid data mode is not detected, for example, if resolution of a captured image set by the user is lower than that of the display image, the image signal processor 130 does not generate the compression image in step 725, and the method proceeds to step 717. Next, the image signal processor 130 multiplexes the generated compression image and a display image to transmit one frame. In this case, the multiplexed display image may have one of the transmitting formats as illustrated in FIGS. 5a to 5d. The photographed information in the form of meta data is not transmitted. That is, FIG. 6 is a diagram illustrating a procedure of an operation when one frame is configured by a display image and a compression image, and photographed information is not transmitted in this case.

As described above, a frame rate of frame images transmitted from the image signal processor 130 may have a frame rate of 30 fps or greater. Accordingly, the image signal processor 130 may generate a display image of 30 frames per second and a compression image of the number of frames determined according to the interleaved data mode. The generated display image and compression image are multiplexed by the multiplexer 350, and the multiplexed image is transferred to the application processor 140. Referring back to FIG. 6, after step 617, the application processor 140 buffers the display image and the compression image, respectively in step 619. The display image is then displayed through the display unit 160 in step 621 as a preview image and is coded through an MPEG coder 390, and the coded image is stored in the storage unit 150.

As described above, in a state that the camera 110 performs a moving image photographing mode (identically performed except for an operation of storing a moving image in a preview mode), if the user generates a capture request command, the application processor 140 detects for the capture request command in step 623. If no capture request command is detected in step 623, the method proceeds to step 627. However, when the capture request command is detected in step 623, the compression image buffer 385 selects a preset compression image from the buffered compression images and stores the selected compression image in the storage unit 150 in step 625 and loops back to step 615. In this case, a method of setting the compression image may be performed using various schemes. First, when a zero shutter-lag is set, the compression image buffer 385 selects a compression image corresponding to a frame when the capture request command is generated and stores the selected compression image in the storage unit 150. For example, in a case where shutter delay (shutter lag) is set to two frames, if the capture request command is generated, the compression image buffer 385 stores compression data of a previous frame of two buffered frames in the storage unit 150 to implement zero shutter-lag. In this case, there is no compression image of a corresponding frame (when the compression image is transmitted as illustrated in FIG. 5b or 5c), and the compression image buffer 385 selects a buffered compression image of a frame closest to, or substantially adjacent to or subsequent to, another frame in time implementing the zero shutter-lag. Second, the compression image buffer 385 may set a function of selecting desired compression images while displaying the thumbnail image or the display image. The foregoing operation is repeatedly performed by steps 615-625 until a moving image photographing operation is terminated. Referring back to step 623, if no capture request command is detected in step 623, and so the moving image photographing may have been terminated, the image signal processor 130 and the application processor 140 detect the terminated moving image photographing in step 627. If no termination of a moving image photographing is detected in step 627, the method loops back to step 615. Otherwise, if moving image photographing is detected in step 627, the method terminates a moving image photographing mode and the method ends. In this case, if the user does not stop operation of the camera, the image signal processor 130 and the application processor 140 perform a preview mode. Any additional or remaining operations, except for an operation of storing a moving image by the application processor 140, are performed by the same procedures of FIG. 6. That is, the operation of the image signal processor 130 may be identically performed in a preview mode or a moving image photographing mode.

Figure 8:
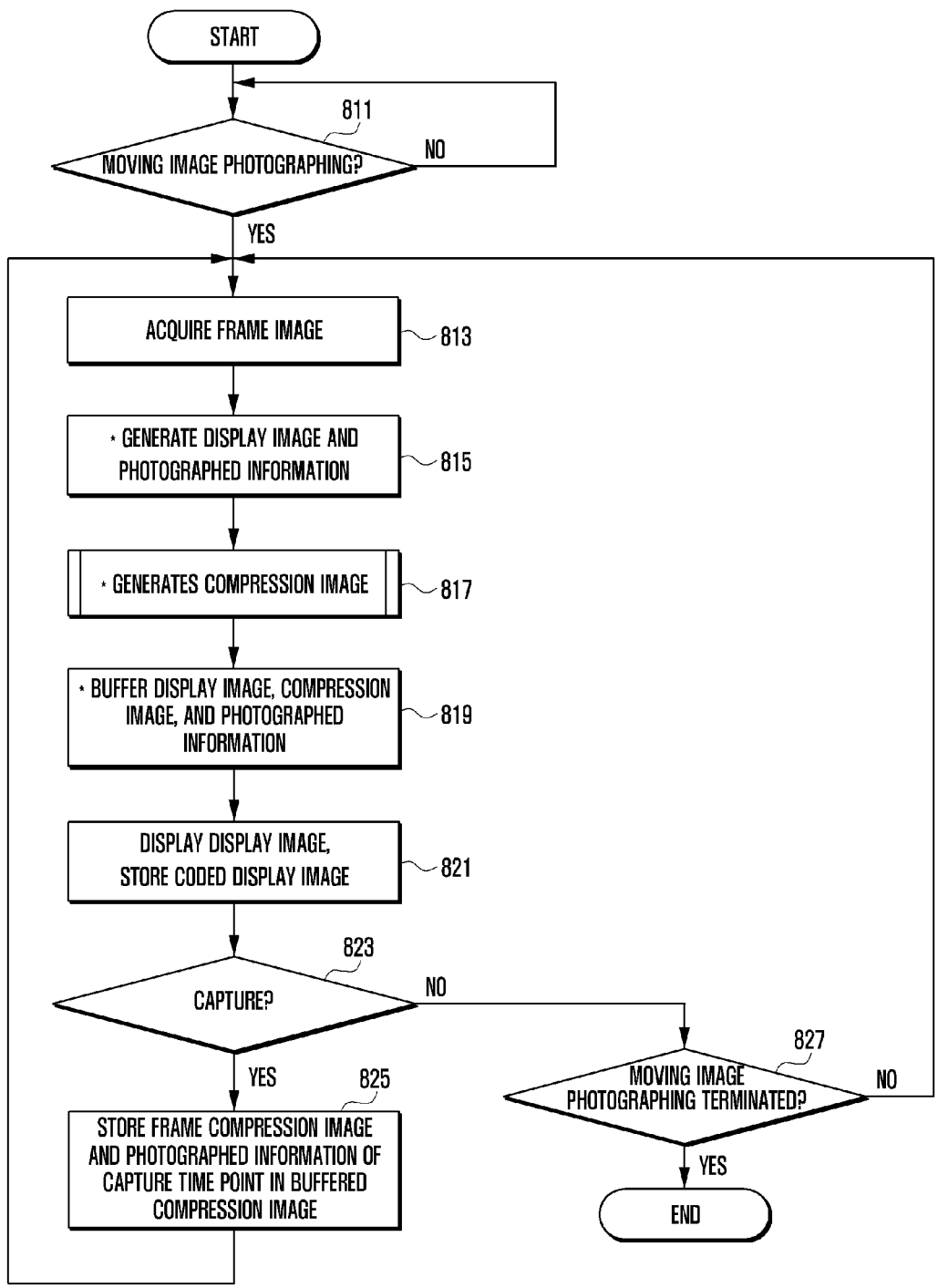
FIG. 8 is a flowchart illustrating a method of generating and processing a display image, a compression image, and photographed information for each frame by a camera device according to the exemplary embodiment of the present invention.

FIG. 8 is a flowchart illustrating a method of generating and processing a display image, a compression image, and photographed information for each frame by the camera 110 according to the exemplary embodiment of the present invention. FIG. 8 performs substantially the same operations and steps as that of the FIG. 6 except that the image signal processor 130 generates and transmits photographed information, the application processor 140 buffers the transmitted display image, compression image, and photographed information, and adds an output of the sensor 120 to the photographed information transmitted from the image signal processor 130 during buffering to generate and buffer the photographed information.

Referring to FIG. 8, if the camera 110 is operated, the camera 110 performs a preview mode. As described above, in a state that the preview mode is performed, the user may request moving image photographing. In this case, if the user requests the moving image photographing, the application processor 140 detects the request of the moving image photographing in step 811. If moving image photographing mode is not requested, the method loops back to step 811. However, if the moving image photographing mode is requested in step 811, the method performs a moving image photographing mode in subsequent steps. However, if the camera 110 is operated, the image signal processor 130 performs the same operation regardless of a preview mode, a capture mode, and a moving image photographing mode. Accordingly, if the camera is operated, the image signal processor 130 acquires an image and photographed information from the camera 110 in step 813. In this case, the camera 110 photographs an image having a full HD resolution or greater, which may be an image having UHD resolution, and the image signal processor 130 acquires a frame image in step 813. In this case, the image signal processor 130 acquires an image at a preset frame rate, and the frame rate may be 30 fps. After acquiring the frame image, the image signal processor 130 generates a display image and photographed information in a corresponding frame in step 815, and generates a compression image in 817. In this case, as illustrated above, the compression image is determined according to the bus bandwidths of the image signal processor 310 and the application processor 140, and an interleaved data mode is used according to the determined bandwidths. In this case, the interleaved data mode is one of the possible transmitting methods used by the present invention as illustrated in FIGS. 5a to 5f. In this case, a procedure of generating the compression image in step 817 is performed in the same manner as a procedure of the operation of FIG. 7 described above, and a transfer format becomes one of the formats shown in FIGS. 5a to 5e.

As described above, a frame rate of frame images transmitted from the image signal processor 130 may be 30 fps or greater (e.g., 60 fps). Accordingly, the image signal processor 130 may generate a display image of 30 frames per second and a compression image having the number of frames determined according to the interleaved data mode. The foregoing generated displayed image, compression image, and photographed image are multiplexed by the multiplexer 350, and transferred to the application processor 140. Referring back to FIG. 8, after step 817, the application processor 140 buffers the display image, the compression image, and the photographed information, respectively in step 819. The display image is then displayed as a preview image through the display unit 160 in step 821 and coded through the MPEG coder 390, and the coded display image is stored in the storage unit 150 in step 821.

As illustrated above, in a state that the camera 110 performs the moving image photographing mode (identically performed except for an operation of storing a moving image in a preview mode), if the user generates a capture request command, the application processor 140 detects for the generation of the capture request command in step 823. If no capture request command is detected in step 823, the method proceeds to step 827. However, when the capture request command is detected in step 823, the compression image buffer 385 selects a preset compression image from the buffered compression images and stores the selected preset compression image in the storage unit 150 in step 825, and loops back to step 813. In this case, a method of setting the compression image may be performed in various schemes. First, when a zero shutter-lag is set, the compression image buffer 385 selects a compression image corresponding to a frame when the capture request command is generated and stores the selected compression image in the storage unit 150. For example, in a case where shutter delay (shutter lag) is set to two frames, if the capture request command is generated, the compression image buffer 385 stores compression data of a previous frame of two buffered frames in the storage unit 150 to implement zero shutter-lag. In this case, there is no compression image of a corresponding frame (when the compression image is transmitted as illustrated in FIG. 5b or 5c), and the compression image buffer 385 selects a buffered compression image of a frame closest to, or substantially adjacent to or subsequent to, another frame in time implementing the zero shutter-lag. Second, the compression image buffer 385 may set a function of selecting desired compression images while displaying the thumbnail image or the display image.

The foregoing operation is repeatedly performed by steps 813-825 until a moving image photographing operation is terminated. Referring back to step 823, if no capture request command is detected in step 823, and so the moving image photographing may have been terminated, the image signal processor 130 and the application processor 140 detect the terminated moving image photographing in step 827. If no termination of a moving image photographing is detected in step 827, the method loops back to step 813. Otherwise, if moving image photographing is detected in step 827, the method terminates a moving image photographing mode and the method ends. In this case, if the user does not stop operation of the camera, the image signal processor 130 and the application processor 140 perform a preview mode. Any additional or remaining operations except for an operation of storing a moving image by the application processor 140 are performed by the same procedures of FIG. 8. That is, the operation of the image signal processor 130 may be identically performed in a preview mode or a moving image photographing mode.

Figure 9:
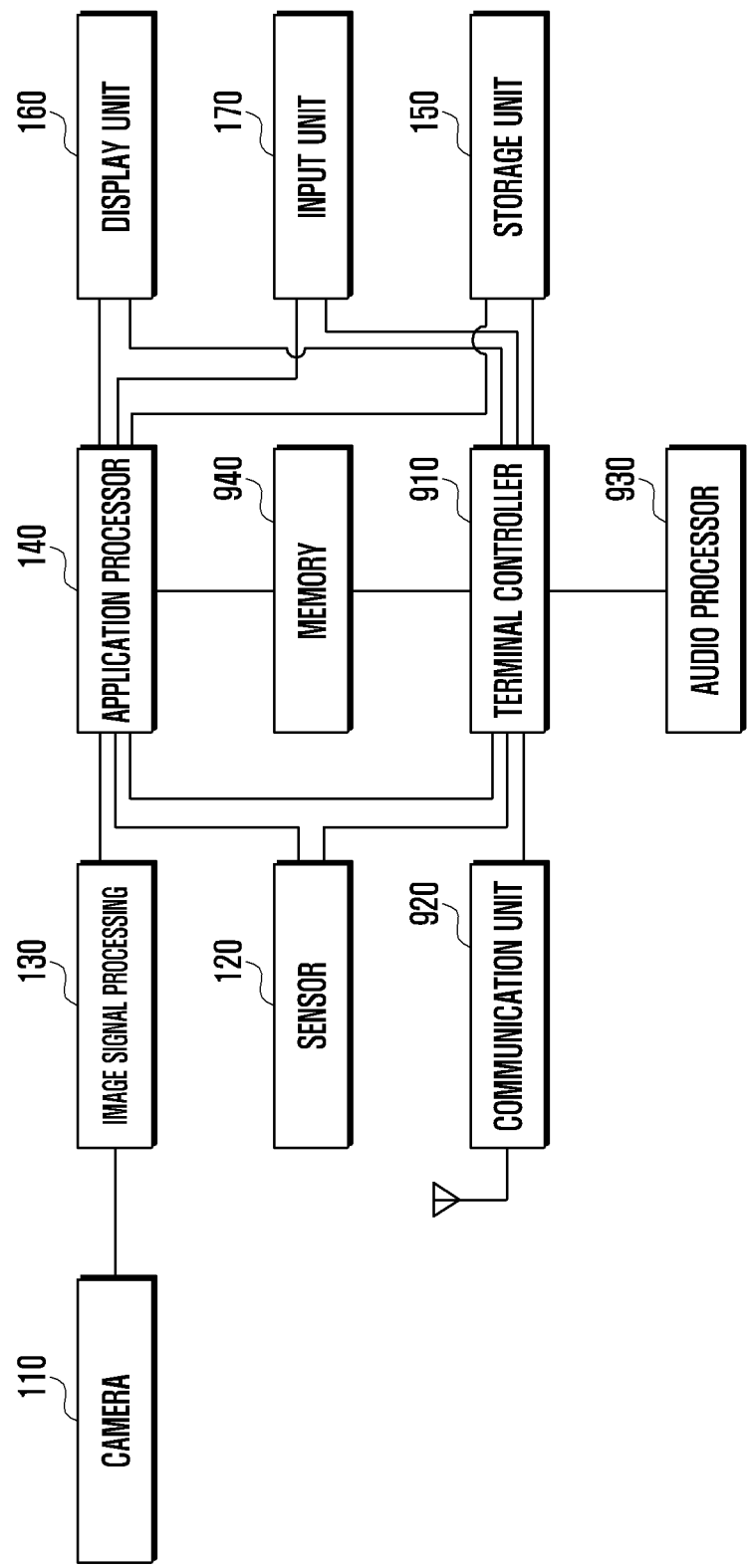
FIG. 9 is a block diagram illustrating a configuration of a portable terminal apparatus including the camera device according to the exemplary embodiment of the present invention.

FIG. 9 is a block diagram illustrating a configuration of a portable terminal apparatus including the camera 110 according to the exemplary embodiment of the present invention.

Referring to FIG. 9, the portable terminal apparatus includes the camera 110 and the sensor 120 as described in the exemplary embodiment of FIG. 1, to perform a function of acquiring an image through the sensor 120 when the camera 110 is activated. The sensor 120 may include at least one sensor mounted in the camera 110, which includes at least one of a GPS receiver, a gyro sensor, an acceleration sensor, an altitude sensor, and a direction sensor.

An image signal processor 130 processes an image acquired from the camera 110 to generate a display image on a display unit 160 and a compression image to be stored in response to a capture request. The display image may include a YUV image. The compression image may include a JPEG image. Upon generation of the compression image, the image signal processor 130 determines a method of generating and transmitting the compression image according to a bus bandwidth. In this case, a transfer format of the compression image may be one of the formats shown in FIGS. 5a to 5f.

Accordingly, the application processor 140 performs various application functions of a portable terminal apparatus. The application processor 140 may receive, as input, the output of the sensor 120, and process various sensor applications according to a request of a user. For example, the application processor 140 may receive, as input, the output of GPS reception to process a navigation function and an application detecting regional information according to a location of a camera 110 and/or the portable terminal apparatus. The application processor 140 may execute an application which executes a preset function in a currently executed application according to movement of the portable terminal apparatus. In particular, the application processor 140 buffers the display image, the compression image, and the photographed information transmitted from the image signal processor 130 during operation of the camera 110, and controls the display unit 160 to output and display the display image according to the exemplary embodiment of the present invention. In this case, if a current mode is a moving image photographing mode, the application processor 140 operates the MPEG coder 390 to compression-code the display image in an order determined by the configuration of data in a frame and to store the compression-coded display image as a moving image. If a capture request command of a still image of the user is generated in the preview mode or a moving image photographing mode, the application processor 140 selects a compression image corresponding to a frame when the capture command is generated from the buffered compression images and stores the selected compression image in the storage unit 150 to implement a zero shutter-lag function. In this case, as shown in FIGS. 5b and 5c, when the compression image is transmitted, the application processor 140 may select and store a buffering compression image of a frame closest to, or substantially adjacent to or subsequent to, another frame in time when the capture command is generated to implement the zero shutter-lag. When the compression image is transmitted as illustrated in FIG. 5d, the application processor 140 confirms a frame when capture is requested, confirms frame count information of a JPEG image stored by dividing data, and accesses and stores a buffered compression image of the confirmed frame in the storage unit 150. In this case, when the JPEG image is divided (for example, the JPEG 3 image and the JPEG 5_2 image in FIGS. 5d and 5e, respectively), the application processor 140 couples the divided compression images and stores the coupled compression images.

A communication unit 920 performs a communication function with an external device or a base station. The communication unit 920 may include a transmitter having a frequency up converter for up-converting a transmitted signal to an RF band and a power amplifier, a low-noise amplifier for low-noise amplifying an RF received signal, and a frequency down converter for down-converting an RF signal to a baseband. The communication unit 920 may include a modulator for modulating the transmitted signal and transferring the modulated signal to the transmitter and a demodulator for demodulating a signal output from the receiver. The modulator and the demodulator may include a modulator and a demodulator of a WCDMA, GSM, LTE, WIFI, or WIBRO scheme.

A terminal controller 910 controls an overall operation of the portable terminal apparatus, and performs voice call and data communication functions. The terminal controller 910 may include a modulator and a demodulator of the communication unit 920. In an alternative exemplary embodiment, the communication unit 920 may include only an RF communication unit. In this case, the terminal controller 910 may perform a function of modulating/demodulating and coding/decoding the communication signal. An audio processor 930 may be connected to a handset of the portable terminal apparatus and processes a call voice during voice communication under the control of the terminal controller 910. The memory 940 may be a work memory in which programs of the terminal controller 910 and the application processor 140 are loaded. In this case, the memory 940 may be configured to include at least a RAM.

The input unit 170 generates and provides various operation commands and data input signals of the portable terminal apparatus to the terminal controller 910 and the application processor 140. In particular, the input unit 170 may respond to user selections and inputs to generate and provide a camera operation command and a capture command to the application processor 140. The input unit 170 may generate a command requesting display of photographed information and/or thumbnail images according to a user request upon capture of the image. The display unit 160 displays an operation of the portable terminal apparatus and an application execution state under the control of the terminal controller 910 and the application processor 140. In particular, the display unit 160 displays a display image output from the application processor 140 in a preview mode according to the exemplary embodiment of the present invention. The display unit 160 may display photographed information and/or thumbnail images output from the application processor 140. The input unit 170 may include a touch panel for detecting a touch input of the user. The display unit 160 may include an LCD or OLED panel for displaying data and images generated during execution of a program. The input unit 170 and the display unit 160 may be an integral touch screen. The input unit 170 may include at least one button or multiple buttons located on or accessible at the exterior of the camera 110.

The storage unit 150 may include a program memory storing an operation program of the portable terminal apparatus and programs according to the exemplary embodiment of the present invention, and a data memory storing data for executing a program and data generated during execution of the program. In this case, the storage unit 150 may be configured by a non-volatile memory such as a flash memory. In particular, the storage unit 150 stores a buffered compression image in the application processor 140 upon a capture request according to the exemplary embodiment of the present invention.

A portable terminal apparatus having a configuration as illustrated in FIG. 9 may perform incoming/outgoing call and communication services, and process an image photographed by the camera 110 in a camera photographing mode according to the exemplary embodiment of the present invention. When starting a portable terminal according to a power on procedure of the portable terminal, the terminal controller 910 loads a call and communication application in the storage unit 150 and operation programs of the portable terminal apparatus to the memory 940. When execution of a selected application is requested, the application processor 140 loads a program for operating corresponding applications stored in the storage unit 150 to the memory 940. Accordingly, upon start up of the system of the portable terminal apparatus, the memory 940 performs a work memory function in which operation programs of the portable terminal apparatus and application programs are loaded. The application processor 140 may share the memory 940 with the terminal controller 910, and the memory 940 may be independently configured and used.

The application processor 140 processes an image processing application of a camera 110 and various applications of the portable terminal apparatus. To process the foregoing various applications, the application processor 140 may receive, as input, the output of the sensor 120. The application processor 140 may execute an application using an output of the sensor 120 or control a processing operation of an application according to the output of the sensor 120. The terminal controller 910 may receive, as input, the output of the sensor 120, and perform a call or communication service or control the call or communication service according to the output of the sensor 120.

Upon initiating an outgoing call, the user may input, select and/or generate an outgoing phone number and a call request signal. The terminal controller 910, having detected the outgoing phone number and call request signal, controls the communication unit 920 to form a call path, and performs an outgoing call function through a base station. If an incoming call is detected and/or received, the terminal controller 910 detects the incoming call, and generates an incoming notification and/or alarm through the audio processor 930, and displays incoming information through the display unit 160. In this case, if the user responds to accept and conduct the incoming call through the input unit 170, the terminal controller 910 forms an incoming call path through the communication unit 920 to perform a call service. The portable terminal apparatus conducts data communication by forming a communication path in an operation similar to the operations for performing an incoming or outgoing call.

When a display image and a compression image (or the display image, the compression image, and photographed information) cannot be transmitted for each frame with a bandwidth of the image signal processor 130, or the application processor 140 has a processing limit of a bus bandwidth by execution of another application, as described above, the compression image may be transmitted in a hybrid transmitting method.

The camera 110 and portable terminal apparatus including such a camera 110 according to the exemplary embodiment of the present invention includes an image signal processor 130 for acquiring an image from the camera 110 to generate a display image and a compression image, multiplexing the display image and the compression image, and transmitting the multiplexed frame image; and an application processor 140 for buffering the multiplexed frame image and storing a preview using the buffered frame image. In this case, it is difficult in the prior art to simultaneously store an image having full HD resolution and a still image having UHD resolution according to a bus bandwidth between the image signal processor 130 and the application processor 140. To solve this problem in the prior art, when transmitting the display image and the compressing image as one frame, the exemplary embodiment of the present invention can simultaneously store the image of the full HD resolution and the still image of the UHD resolution by transmitting the compression image at a preset frame interval in a hybrid scheme according to the bus bandwidth.

The above-described apparatus and methods according to the present invention can be implemented in hardware, firmware or as software or computer code that can be stored in a non-transitory recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of processing an image of a portable terminal, the portable terminal comprising an image signal processor (ISP) and an application processor (AP), the method comprising:
   acquiring, at the ISP, an image from a camera unit for each frame of a plurality of frames during an operation of the camera;
   determining, at the ISP, a method of generating and transmitting a compression image according to a bus bandwidth from among a plurality formats that includes a hybrid transmitting scheme when the ISP or AP has a processing limit based on current bandwidth utilization;
   generating, at the ISP, a display image and the compression image by processing the acquired image;
   transmitting at a preset frame interval the display image generated by the ISP at a full High Definition (HD) resolution or greater for each frame and the compression image comprising a still image having an ultra-HD (UHD) resolution; and
   displaying, at the AP, the display image and buffering, at the AP, the compression image.

2. The method of claim 1, wherein the transmitting of the display image and the compression image comprising:
   transmitting the display image and the compression image at N frame intervals.

3. The method of claim 2, wherein the N frame for transmitting the compression image is set in accordance with a size of the display image.

4. The method of claim 2, further comprising selecting, in response to a capture request, a compression image from a plurality of buffered compression images, the selected compression image corresponding to a frame of zero shutter-lag and storing the selected compression image as a captured image.

5. The method of claim 4, further comprising transmitting a thumbnail image in a frame in which the compression image is not transmitted.

6. The method of claim 4, further comprising:
   selecting, in response to the capture request, a compression image of a frame substantially adjacent to a frame of zero shutter lag in time when there is no compression image corresponding to the frame of the zero shutter lag among the buffered compression images; and
   storing the selected compression image as a captured image.

7. The method of claim 4, wherein the display image is a YUV image and the compression image is a JPEG image.

8. The method of claim 2, wherein the transmitting of the display image and compression image comprising:
   transmitting the compression image of a plurality of frames during one frame period when a size of the compression image is below a predetermined size threshold; and
   performing a hybrid transmission mode which transmits a corresponding compression image to be divided into a plurality of frames by dividing a container of the corresponding compression image.

9. The method of claim 8, further comprising, in response to a capture request, selecting a compression image corresponding to a frame when the capture is requested among the buffered compression images; and
   merging and storing divided compression images when the selected compression image includes divided compression images.

10. A portable terminal comprising:
    a camera;
    an image signal processor (ISP) that acquires a frame image for each frame of a plurality of frames from the camera upon operation of the camera and that determine, at the ISP, a scheme to generate and transmit a compression image according to a bus bandwidth;
    generating the acquired image including a display image and a compression image, transmitting the display image for each frame, and transmitting the compression image at a preset frame interval;
    an application processor (AP) for outputting the acquired display image and buffering the compression image; and
    a display unit for displaying the display image output from the AP;
    wherein the scheme to generate and transmit the compression image is selected from among a plurality formats that includes utilizing a hybrid transmitting scheme when the ISP or AP has a processing limit based on current bandwidth utilization, wherein the ISP transmits to the AP the display image at a preset frame interval having a full High Definition (HD) resolution or greater for each frame and transmits the compression image having an ultra-HD (UHD) resolution.

11. The portable terminal of claim 10 wherein the ISP sets a frame interval of N for transmitting the compression image, according to a size of the display image.

12. The portable terminal of claim 11, wherein the AP selects, in response to a capture request, a compression image from a plurality of buffered compression images, the selected compression image corresponding to a frame of zero shutter lag; and
    stores the selected compression image as a captured image.

13. The portable terminal of claim 10, wherein the ISP comprises;
    a scaler for scaling an image acquired from the camera to generate the display image;
    a compression coder for compression-encoding the image acquired from the camera to generate the compression image;
    an image processing controller for transmitting the display image for each frame and transmitting the compression image at a preset frame interval; and
    a multiplexer, under a control of the image processing controller, for multiplexing the display image and the compression image and transmitting a multiplexed frame image and information in one frame.

14. The portable terminal of claim 13, wherein the AP comprises:
    a demultiplexer for demultiplexing the display image and the compression image transmitted from the ISP;
    a display image buffer for buffering the display image;
    a compression image buffer for buffering the compression image; and
    an application processing controller for selecting, upon a capture request, a compression image of a frame of zero shutter lag from the buffered compression image and storing the selected compression image as a captured image.

15. The portable terminal of claim 14, wherein the ISP further comprises a thumbnail image generator, and the image processing controller transmits a thumbnail for each frame in which no compression image is transmitted.

16. The portable terminal of claim 15, wherein the application processing controller selects, in response to the capture request, a compression image of a frame substantially adjacent to a corresponding frame in time when there is no compression image corresponding to the corresponding frame when the capture is requested among the buffered compression images and stores the selected compression image as a captured image.

17. The portable terminal of claim 16, wherein the ISP further comprises a memory, and the image processing controller stores the compression image in the memory and analyzes a size of the compression image, controls the multiplexer such that a compression image of a plurality of frames is transmitted during one frame period when the size of the compression image is below a predetermined size threshold, and such that the compression image is selected to be divided into a plurality of frames and is transmitted by dividing a container of the selected compression image.

18. The portable terminal of claim 17, wherein the application processing controller selects, in response to the capture request, a compression image corresponding to a frame when the capture is requested among the buffered compression images, and merges and stores divided compression images when the selected compression image includes divided compression images.

19. The portable terminal of claim 16, further comprising:
    a communication unit for performing wireless communication with an external device; and
    a terminal controller for controlling a call and communication of the portable terminal through the communication unit,
    wherein the AP processes a communication application by communicating with the terminal controller.

* * * * *